Nov. 17, 1953        H. P. HOLMAN        2,659,289
DRAG WEIGHT FOR COVERING AND PACKING PLANTED SEED
Filed Nov. 22, 1949
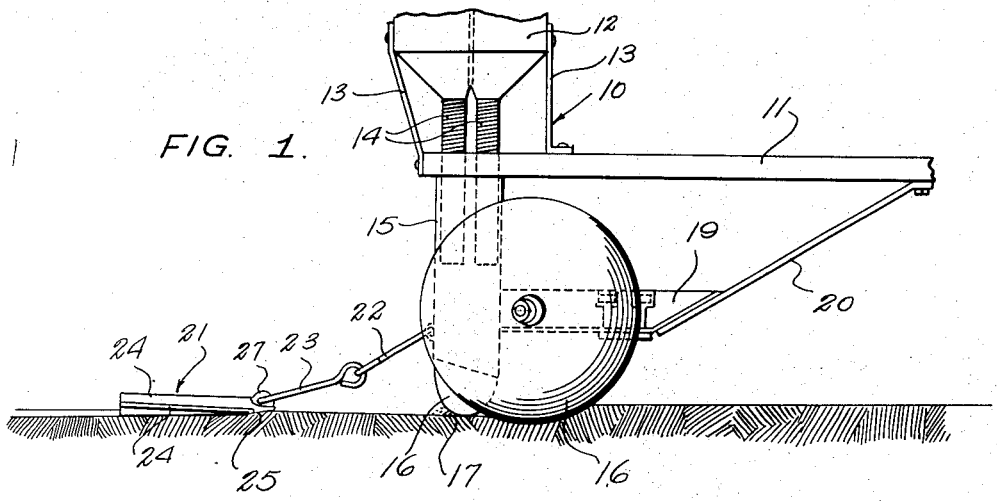
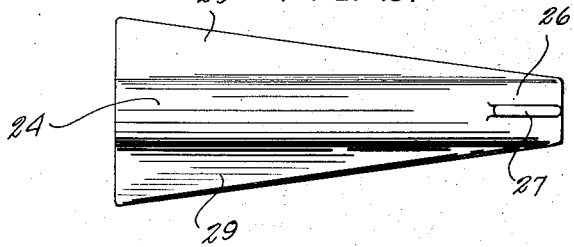
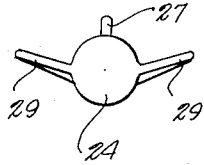
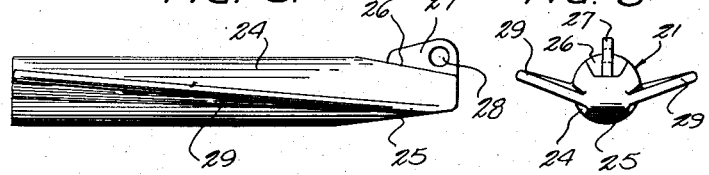
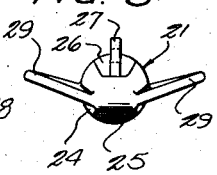
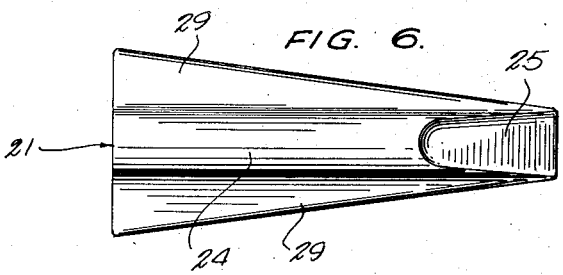
INVENTOR
HARRY P. HOLMAN,
BY
*McMorrow, Berman & Davidson*
ATTORNEYS Patented Nov. 17, 1953

2,659,289

UNITED STATES PATENT OFFICE 2,659,289

DRAG WEIGHT FOR COVERING AND PACKING PLANTED SEED

Harry P. Holman, Arkansas City, Kans.

Application November 22, 1949, Serial No. 128,735

4 Claims. (Cl. 97—56)

My invention relates to a drag weight for covering and packing planted seeds.

The primary object of my invention is to provide a drag weight of the above-mentioned character adapted to be connected at the rear of a disc drill or seeder and to be dragged in the furrow formed by the disc for covering and packing or tamping the seed dispensed by the seeder.

A further object is to provide a device of the above-mentioned character which is highly simplified in construction, unitary, long lasting and cheap to manufacture.

A further object is to provide a drag weight of the above-mentioned character including means which engage the soil and coact therewith to increase the downward pressure exerted on the seed by the drag weight.

A still further object is to provide a drag weight of the above-mentioned character which will not readily turn over during use.

Other objects and advantages of my invention will be apparent during the course of the following description.

In the accompanying drawings forming a part of this application, and in which like numerals are employed to designate like parts throughout the same:

Figure 1 is a side elevation of a drag weight embodying my invention, and showing the same connected at the rear of the conventional disc drill or seeder;

Figure 2 is a top plan view of the drag weight removed;

Figure 3 is a side elevation of the same;

Figure 4 is a left end elevation of the device as shown in Figure 3;

Figure 5 is a right-hand elevation of the device as shown in Figure 3; and

Figure 6 is a bottom plan view of the drag weight.

In the drawings, where, for the purpose illustrated is shown a preferred embodiment of my invention, the numeral 10 designates generally a conventional disc drill or seeder, including the usual horizontal support frame 11 and hopper or seed box 12 rigidly mounted thereon by means of upstanding braces or bars 13. Flexible seed-dispensing hoses 14 are connected with the lower discharge end of the hopper 12, and have their lower discharge ends projecting into the usual grain shoe 15 rigidly secured to the frame 11. The bottom or discharge end of the grain shoe 15 is equipped with the usual steel bottom plate or deflector 16 for guiding the grain into the furrow 17 formed by a disc 18 rigidly mounted upon a support casting 19, in turn rigidly connected with the frame 11 by any suitable means including a brace 20. The construction thus far described is all conventional and well known.

The drag weight embodying my invention is designated generally by the numeral 21, and may be connected to the rear side of the grain shoe 15 near the bottom of the grain shoe by means of links 22 and 23. The forward link 22 is connected directly with the shoe 15, as shown in Figure 1, while the rear or trailing link 23 is pivotally connected with the forward end of the drag weight 21, as will be more fully described.

The drag weight 21 is preferably about 8½ inches in over-all length, and preferably weighs approximately four pounds, although this length and weight may vary. The drag weight 21 comprises a central, elongated, straight, generally cylindrical body portion or bar 24 provided on its bottom and adjacent to its forward end with a slightly forwardly inclined, flat face or bevel 25. The width of the central body portion or bar 24 is substantially uniform throughout the entire length of the same. Both the forward and rear ends of the bar 24 are substantially blunt, as shown. Adjacent to the forward end of the bar 24, the top side of the same may be slightly downwardly and forwardly bevelled, as shown at 26, and an upstanding, vertical attaching lug 27 is integrally secured to the top of the bar adjacent to its forward end and arranged at the transverse center of the bar, as shown. The lug 27 has an aperture 28 formed therein for pivotally receiving the rear end of the trailing link 23, Figure 1.

The central body portion or bar 24 is provided upon opposite sides with elongated, longitudinally extending, wings or fins 29 which are generally flat and relatively thin. The wings or fins 29 are substantially straight and extend for substantially the entire length of the drag weight. The outer longitudinal edges of the wings 29 diverge rearwardly, as shown, so that the wings are substantially wider near the rear or trailing end of the bar 24 than near the forward end thereof. Adjacent to the rear end of the drag weight, it is preferred that the distance between the opposite rear corners of the wings 29 be approximately 3½ inches, although this distance may vary. The diameter of the central body portion or bar 24 is preferably about 1⅝ inches, so that adjacent to the rear end of the bar 24, the wings 29 project laterally outwardly upon both sides of the bar for approximately one inch, although all of these dimensions may vary, if desired. At the forward end of the bar 24, the combined width of the wings 29 is substantially the same as the diameter of the bar, and wings blend into the sides of the bar adjacent to its forward end, as clearly shown in Figures 2 and 6. As shown in Figure 3, the wings or fins 29 decline forwardly from a point above the axis of the bar 24 at the rear end thereof to a point below the axis of the bar 24 at the forward end of the bar 24. Adjacent to the rear end of the bar, the inner edges of the wings are integrally connected with the opposite sides of the bar at substantially the vertical center of the bar, as viewed in Figure 3, while at the forward end of the bar, the wings 29 are integrally connected with the opposite sides of the bar substantially adjacent to the upwardly inclined, flat bottom face 25. on a level below the vertical center of the bar 24. In addition to being tapered and declining forwardly relative to the bar 24, the wings 29 extending outwardly from the opposite sides of the bar 24 at slight upward angles, as shown in Figures 4 and 5. This lateral, upward angulation causes the wings 29 to diverge upwardly and outwardly upon opposite sides of the body portion or bar 24. Adjacent to the rear end of the bar 24, the outer tips of the wings 29 are arranged slightly below the top side of the bar, Figure 4. The drag weight 21 is preferably integrally cast or forged from steel or the like.

The operation of the drag weight 21 is as follows:

With the drag weight 21 connected to the rear end of the disc drill or seeder, as shown in Figure 1, the seeder is drawn forwardly, the disc 18 cutting the longitudinal shallow furrow 17, while the seed is dispensed through the hose 14 and grain shoe 15, and introduced into the furrow 17 by the steel blade 16. The thus dispensed seed lies loosely in the bottom of the furrow 17 and may be partly or wholly uncovered. As the seeder moves forwardly longitudinally, the drag weight 21 travels longitudinally forwardly within the furrow 17. The rounded bottom of the bar 24 below the wings 29 engages as a keel in the bottom of the furrow to guide the drag weight. The upwardly inclined, flat face 25 on the bottom of the bar and at its forward end enables the drag weight to ride over irregularities in the bottom of the furrow and prevents the forward end of the drag weight from pushing or displacing the planted seed forwardly. By virtue of the flat face 25, the forward blunt end of the drag weight is elevated slightly from the bottom of the furrow, and the inclined face 25 will engage the seeds progressively within the furrow and pack them downwardly, so that the remainder of the bar 24 may engage upon the seeds and apply the entire weight of the device for firmly packing the seeds in place. While this action is occurring, the wings 29 will engage in the opposite sides of the furrow, and due to their downward inclination toward the forward end of the drag weight, the wings will bite into the soil and tend to bury or force downwardly the drag weight as it travels longitudinally forwardly in the furrow.

The converging, longitudinal side edges of the wings 29 help to guide the drag weight within the furrow, and prevent the same from offering too much resistance to being pulled longitudinally.

Due to the cylindrical shape of the central body portion or bar 24 below the wings 29, when the drag weight is pulled over the seed for covering and packing it in the bottom of the furrow, substantially the original shape of the furrow is preserved, so that moisture from winter snows and the like will tend to collect in the furrow after the seeds have been planted, which is desirable. The drag weight 21 will also tend to break up or crush all clods in the small furrow, while packing and covering the seed, as this is desirable. By thus covering and packing the soil over the grain or seed in the bottom of the furrow 17, substantially all of the undesirable air pockets which may surround the grain are eliminated. Further, the packed soil about the grain will tend to hold moisture and will not dry out so quickly as loose soil. The bevel or inclined face 25 enables the drag weight to ride over the seed in the furrow and press it downwardly rather than disturbing the seed and causing it to move longitudinally in the furrow, as previously stated.

I have found that the above-described, desirable results are not obtainable with the use of the conventional drag chains and like devices generally employed with seeders in an attempt to cover the seed behind the seeder.

While I have shown one of the drag weights 21 being drawn behind the seeder, obviously, as many of the drag weights may be provided as there are discs 18 upon the seeder. With multiple planters forming multiple furrows, I contemplate using one of the drag weights 21 when traveling in each furrow formed by the seeder. I also contemplate using my drag weights behind corn planters, as well as behind grain drills.

It is to be understood that the form of my invention herewith shown and described is to be taken as a preferred example of the same, and that various changes in shape, size and arrangement of parts may be resorted to without departing from the spirit of my invention or the scope of the subjoined claims.

Having now described my invention, I claim:

1. In a drag weight adapted to be trailed behind the seed drill of a seeder having a disc arranged to form a furrow into which seed is deposited by the seed drill, as the seeder is moved forwardly, a longitudinally elongated cylindrical body portion having a rounded bottom to ride in the furrow in contact with the wall thereof, means on the forward part of said central body portion by which the drag weight can be connected to the seeder, and longitudinal wings projecting from the opposite sides of said central body portion and extending for substantially the full length of said central body portion, said wings being substantially flat and of smaller vertical cross section than said central body portion, said wings declining forwardly from a point above the longitudinal axis of said central body portion at the rearward end thereof to a point below the longitudinal axis of said central body portion at the forward end thereof.

2. In a drag of the character described, a longitudinally elongated substantially cylindrical central body portion arranged to occupy a depressed position in a furrow by reason of its weight and to be moved along the furrow so as to depress seed into the wall of the furrow, said central body portion being formed with wings on its opposite sides, said wings extending laterally outwardly from the sides of said central body portion and extending between the opposite ends of said central body portion.

3. In a drag of the character described, a longitudinally elongated central body portion having a substantially semi-cylindrical under portion, said under portion being arranged to occupy a depressed position in a furrow and to be moved along the furrow to depress seed into the wall of the furrow, said central body portion having wings on its opposite sides, said wings extending laterally outwardly from said central body portion and along the opposite sides of said central body portion, said wings extending laterally from the opposite sides of said central body portion at opposite upward angles.

4. In a drag of the character described, a longitudinally elongated central body portion having a substantially semi-cylindrical under portion, said under portion being arranged to occupy a depressed position in a furrow and to be moved along the furrow to depress seed into the wall of the furrow, said central body portion having wings on its opposite sides, said wings extending laterally outwardly from said central body portion and along the opposite sides of said central body portion, said central body portion having a forward end and said wings having laterally outward edges converging toward the sides of said central body portion and forwardly toward the forward end of said central body portion.

HARRY P. HOLMAN.

References Cited in the file of this patent

UNITED STATES PATENTS

| Number | Name | Date |
|---|---|---|
| 124,643 | Valk | Mar. 12, 1872 |
| 232,204 | Prairie | Sept. 14, 1880 |
| 681,227 | Johnson | Aug. 27, 1901 |
| 788,961 | Stogner | May 2, 1905 |
| 1,051,873 | Erb | Feb. 4, 1913 |
| 1,112,894 | Clark | Oct. 6, 1914 |
| 1,258,789 | Krotz | Mar. 12, 1918 |
| 1,418,260 | Hood | May 30, 1922 |
| 2,259,303 | Ewerth | Oct. 14, 1941 |

FOREIGN PATENTS

| Number | Country | Date |
|---|---|---|
| 300,979 | Germany | Oct. 2, 1917 |
| 103,742 | Austria | July 10, 1926 |
| 51,862 | Netherlands | Jan. 15, 1942 |